(12) United States Patent
Medina Casado

(10) Patent No.: US 10,457,481 B2
(45) Date of Patent: Oct. 29, 2019

(54) STRUCTURE PROTECTOR

(71) Applicant: MEDINA CASADO, C.B., Villagonzalo Perdenales (ES)

(72) Inventor: Miguel Medina Casado, Burgos (ES)

(73) Assignee: C. B. Medina Casado, Villagonzalo Perdenales, BU (ES)

( * ) Notice: Subject to any disclaimer, the term of this patent is extended or adjusted under 35 U.S.C. 154(b) by 0 days.

(21) Appl. No.: 15/843,675

(22) Filed: Dec. 15, 2017

(65) Prior Publication Data

US 2018/0170670 A1 Jun. 21, 2018

(30) Foreign Application Priority Data

Dec. 16, 2016 (ES) .................................. 201601083

(51) Int. Cl.
| | | |
|---|---|---|
| *B65G 1/02* | (2006.01) | |
| *E01F 15/14* | (2006.01) | |
| *E06B 1/34* | (2006.01) | |
| *A47B 95/04* | (2006.01) | |
| *A47B 47/02* | (2006.01) | |

(52) U.S. Cl.
CPC ............ *B65G 1/023* (2013.01); *A47B 95/043* (2013.01); *E01F 15/141* (2013.01); *E06B 1/34* (2013.01); *A47B 47/021* (2013.01); *B65G 1/02* (2013.01); *B65G 2207/40* (2013.01)

(58) Field of Classification Search
CPC ...... B65G 1/023; B65G 1/02; B65G 2207/40; E01F 15/141; E06B 1/34; A47B 47/021
See application file for complete search history.

(56) References Cited

U.S. PATENT DOCUMENTS

| | | | | |
|---|---|---|---|---|
| 3,762,335 A | * | 10/1973 | Baker, Jr. ............... | A47B 53/02 104/173.1 |
| 3,915,434 A | * | 10/1975 | Lister .................. | E01F 15/0469 248/188.7 |
| 4,269,534 A | * | 5/1981 | Ryan ....................... | E01F 9/681 256/1 |
| 5,369,925 A | * | 12/1994 | Vargo ....................... | B65G 1/02 211/183 |
| 5,613,798 A | * | 3/1997 | Braverman ............. | E01F 9/688 116/63 C |

(Continued)

FOREIGN PATENT DOCUMENTS

| | | |
|---|---|---|
| EP | 1738030 | 1/2007 |
| ES | 1050834 | 5/2002 |

*Primary Examiner* — Ko H Chan
(74) *Attorney, Agent, or Firm* — Hunt Pennington Kumar & Dula, PLLC

(57) ABSTRACT

Structure protector (5), wherein these structures (5) are shelves, doors, pillars or similar and have support legs (6), which comprises a covering element (1) of the support legs (6), formed by a profile (1.1) with a C-shaped section suitable for being adjusted on the exterior lateral contour of said support legs (6) and with a support base (1.2) to the ground and at least one element with a hollow truncated pyramid shape (2), with three inclined sides (2.1) and one open side, an open lower base and an upper base, which is open towards the open side, which has a horizontal flat surface (2.2) in the contour corresponding to the three inclined sides (2.1), where the shape of the interior contour of this horizontal flat surface (2.2) is suitable for fitting the surface around the covering element (1).

9 Claims, 8 Drawing Sheets

(56) References Cited

U.S. PATENT DOCUMENTS

| | | | | |
|---|---|---|---|---|
| 5,832,675 | A * | 11/1998 | Zuares | E04H 12/2292 52/60 |
| 6,257,557 | B1 * | 7/2001 | Anderson | E01F 15/0469 256/1 |
| 6,260,719 | B1 * | 7/2001 | Azzopardi | B65G 1/02 211/189 |
| 6,527,255 | B2 * | 3/2003 | O'Berry | E04H 17/063 256/1 |
| D522,180 | S * | 5/2006 | Goria, II | D29/130 |
| 7,104,525 | B2 * | 9/2006 | Ricci | E04H 12/2292 256/1 |
| D669,197 | S * | 10/2012 | Connor | D25/133 |
| 9,492,009 | B2 * | 11/2016 | Naka | A47B 47/0091 |
| 9,999,300 | B2 * | 6/2018 | Iellimo | B65C 1/02 |
| 2005/0281641 | A1 * | 12/2005 | Maynard | B65G 1/1375 414/273 |
| 2006/0237378 | A1 * | 10/2006 | Pellegrino | A47F 5/0018 211/29 |
| 2011/0253656 | A1 * | 10/2011 | Vermeer | A47F 5/137 211/85.8 |
| 2016/0235202 | A1 | 8/2016 | Ramon | |
| 2018/0305121 | A1 * | 10/2018 | Laplace | B65G 1/023 |

\* cited by examiner

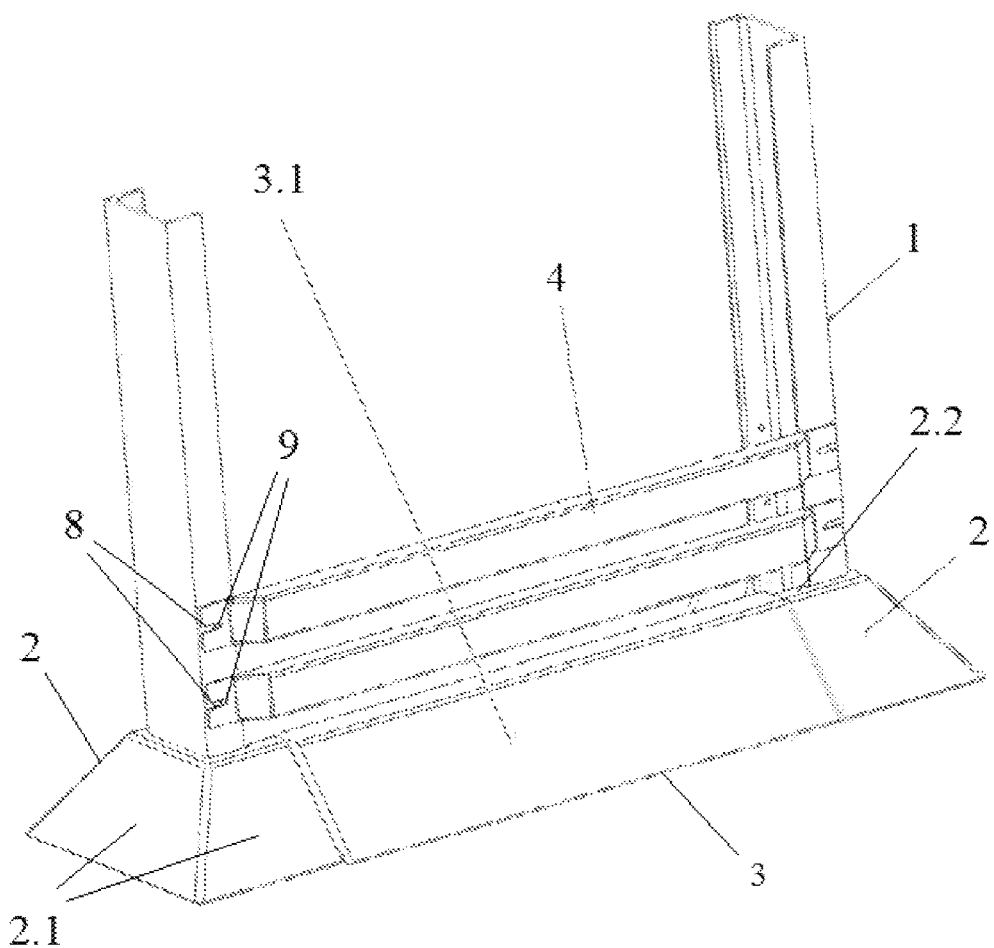
Fig. 1.1

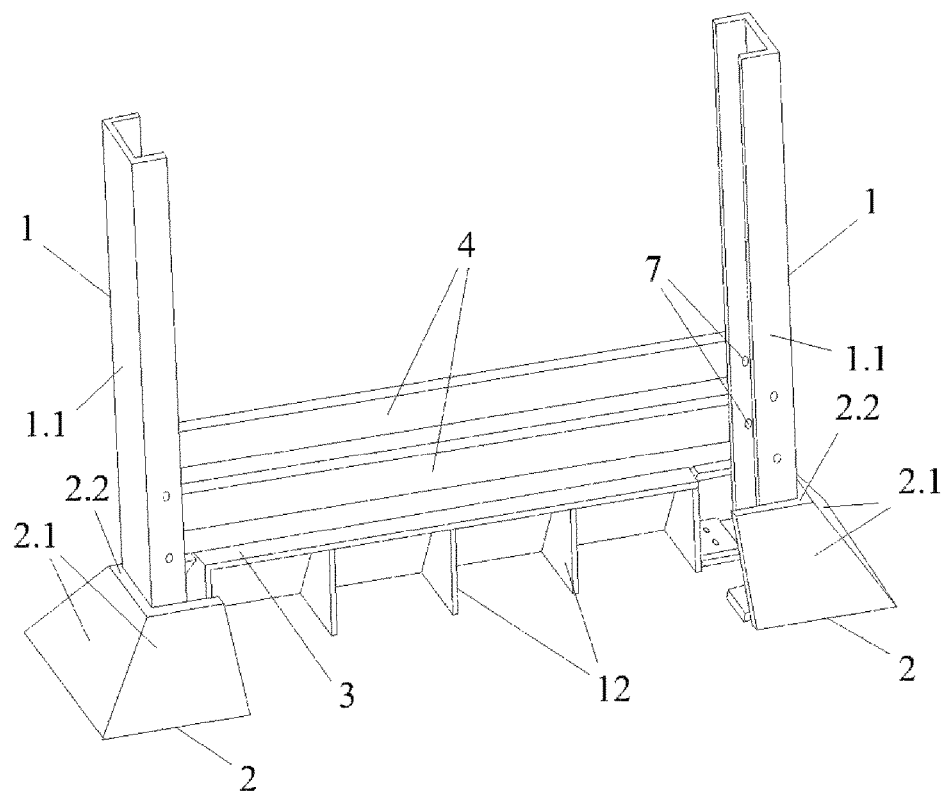
Fig. 1.2

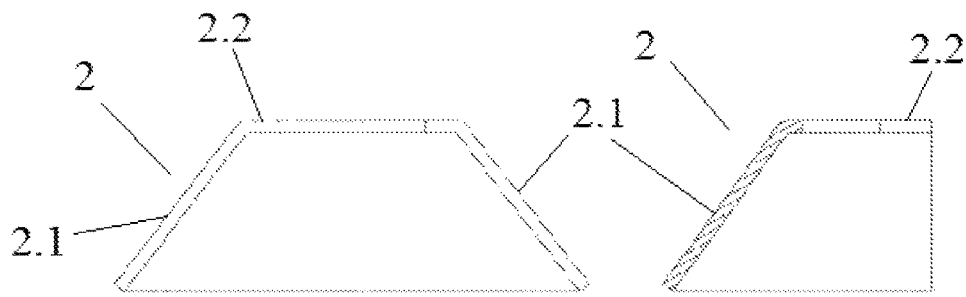
Fig. 3.2          Fig. 3.3
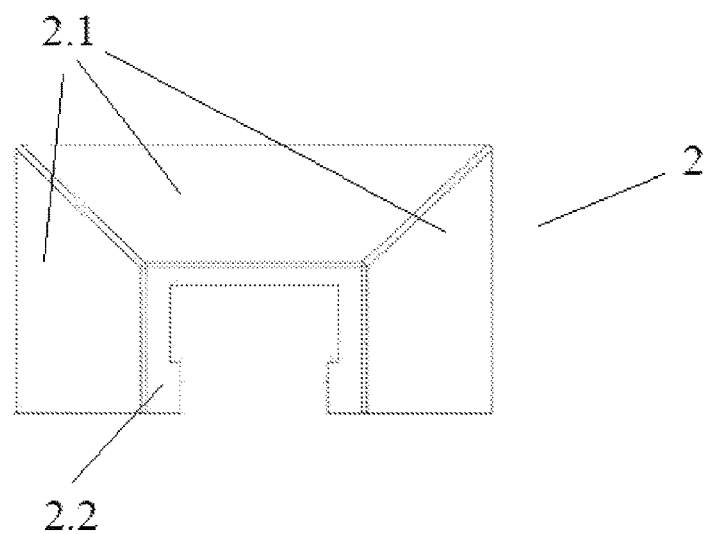
Fig. 3.1

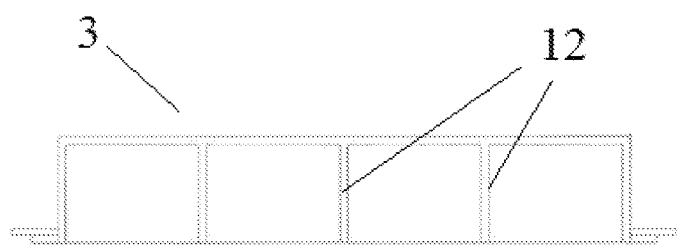
Fig. 4.2
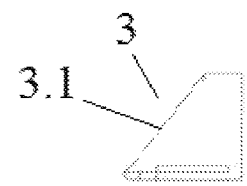
Fig. 4.3
Fig. 4.1

Fig. 5.2
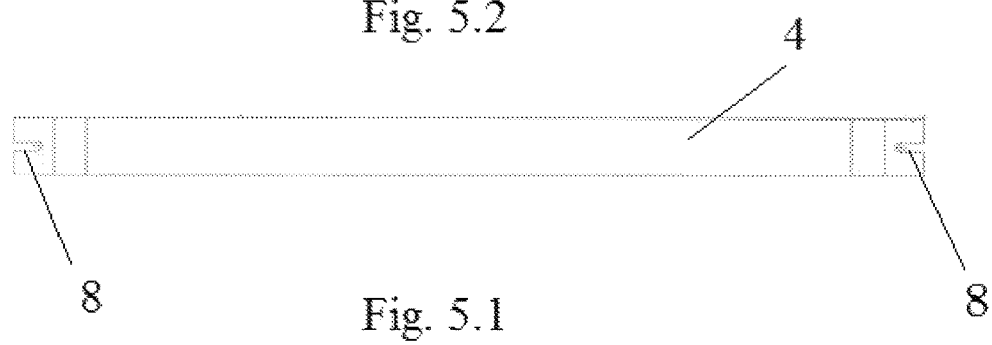
Fig. 5.1

STRUCTURE PROTECTOR

CROSS-REFERENCE TO RELATED APPLICATIONS

This application is related to, and claims priority to, Spanish Patent Application no. P201601083, filed on 16 Dec. 2016. The subject matter of said application is expressly incorporated herein by reference in its entirety.

DESCRIPTION

Technical Field of the Invention

The present invention relates to the technical field of structures present in warehouses in which forklift vehicles or similar are used, specifically a protector for the support legs of said structures, these being shelves, doors, pillars or similar.

Background of the Invention

At present, there are some protector models that are placed on the legs of shelves with the aim of minimising the impact caused by the forklift trucks travelling through the warehouse.

As an example of the prior art, the documents US2016235202, EP1738030 and ES1050834 U may be mentioned.

The reference document US2016235202 relates to a rack protector formed of an exterior casing made of flexible material which is mounted on a vertical column such that in the event of an impact, the knock is absorbed.

Moreover, the reference document EP1738030 has a similar functionality to the previous document and defines a shelf impact protector for palletised loads and whose protection element is coupled to the column without the need for any fixation and protects it from impacts it may receive.

The reference document ES1050834 U relates to a trim protector for metallic shelves and consists of a piece made of thermoplastic material in an angular shape, with internal faces in an outwards inclined plane which serves as frontal protection and as a trim and/or reference element in terms of safety due to its colour which is different from the profiles of the shelf.

All of these cases relate to protectors which absorb the impact and are deformed such that, as a function of the force of the impact of the forklift with the protector, said protector can deform to such an extent that the forklift contacts the structure, possibly causing defects, if not breaking the same.

Description of the Invention

The structure protector, wherein these structures are shelves, doors, pillars or similar and have support legs presented here, comprises a covering element of the support legs of the structure, formed by a profile with a C-shaped section suitable for being adjusted on the exterior lateral contour of said support legs with a height which covers the lower part of the legs and with a support base to the ground.

It also comprises at least one element with a hollow truncated pyramid shape, with three inclined sides and one open side, an open lower base and an upper base, smaller than the lower base, which is open towards the open side, which has a horizontal flat surface in the contour of the same corresponding to the three inclined sides where the shape of the interior contour of this horizontal flat surface is suitable for fitting the surface around the covering element of the support leg.

According to a preferred embodiment, the structure protector comprises at least two covering elements and two elements with a truncated pyramid shape, and also comprises a coupling element fixed to the lower parts of the covering elements which has an exterior face with the same inclination as the inclination of the inclined sides of the elements with a truncated pyramid shape and a length equal to the distance between the same.

According to a preferred embodiment, the structure protector comprises at least one support crossbeam as a joint between two covering elements of the support legs of the structure, both having said covering elements a coupling element between them or not. Said support crossbeam has, at each end of the same, means for fixing to the covering element of one of said support legs respectively.

Similarly, according to a preferred embodiment, the covering element of each support leg comprises at least one hole in at least one of its laterals and the fixing means of the support crossbeam to the same are formed by a groove arranged at each end suitable for being situated to match a hole respectively, and screwing means.

In any of these cases in which there is at least one support crossbeam between two covering elements, in a preferred embodiment, at least one of said support crossbeams is arranged horizontally between the covering elements.

Furthermore and in a preferred embodiment, at least one support crossbeam is arranged diagonally between the covering elements.

According to another aspect, the covering element comprises means for fixing to the ground, formed by holes in the support base to the ground and screwing elements.

According to a preferred embodiment, the covering element comprises reinforcement means, formed by brackets secured between the lower part of the profile and the support base to the ground.

In a preferred embodiment, the coupling element comprises reinforcement ribs along the lower area of the exterior inclined face.

A significant improvement to the prior art is obtained with the structure protector proposed here.

A structure protector is achieved which is placed on any structure with support legs and owing to the inclination which it has, instead of the forklift impacting against the element with a truncated pyramid shape, said forklift is raised above it and does not impact the shelf.

Owing to the coupling element joining the covering elements and the elements with a truncated pyramid shape, the frontal protection of the structure is more robust. This element performs the same function as the truncated pyramid elements owing to the inclination it has.

Similarly, owing to the support crossbeams joining the covering elements, even though the forklift ascends on the coupling element, it cannot get below the shelves of the structure, thereby avoiding it impacting the content of the structure.

A protector is thus achieved in which, instead of absorbing the impact, what it achieves is to facilitate the lifting of the forklift on the same, allowing said forklift to continue its journey without impacting the structure. Possible impacts with the structure are thereby avoided when the force of impact exceeds the absorption ability of a protection device.

Therefore, it a protector that is easy to install and very effective.

BRIEF DESCRIPTION OF THE DRAWINGS

With the object of helping to better understand the characteristics of the invention, in accordance with a preferred practical embodiment thereof, said description is accompanied, as an integral part thereof, by a set of drawings where, in an illustrative and non-limiting manner, the following has been represented:

FIGS. 1.1 and 1.2 show perspective views from a frontal angle and dorsal angle respectively, of a structure protection device for a first preferred embodiment of the invention.

FIGS. 3.1, 3.2, 3.3 show plan, elevation and profile views respectively of the element with a truncated pyramid shape of the structure protection device for a first preferred embodiment of the invention.

FIGS. 4.1, 4.2, 4.3 show plan, elevation and profile views respectively of the coupling element of the structure protection device for a first preferred embodiment of the invention.

FIGS. 5.1 and 5.2 show plan and elevation views respectively of a support crossbeam of the structure protection device for a first preferred embodiment of the invention.

DETAILED DESCRIPTION OF A PREFERRED EMBODIMENT OF THE INVENTION

Figure 2:
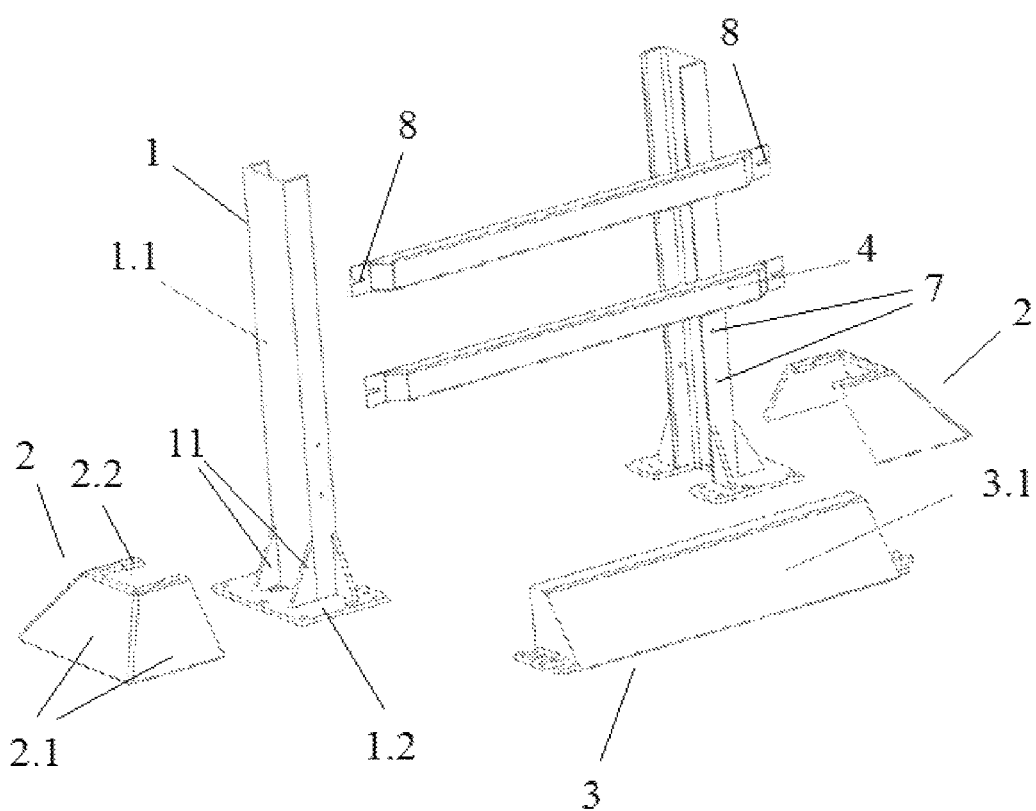
FIG. 2 shows an exploded view of the parts forming the structure protection device for a first preferred embodiment of the invention.

In view of the figures provided, it can be observed how in a first preferred embodiment of the invention, the structure protector, where the structures (5) are shelves, doors or similar and have support legs (6) proposed here, comprises a covering element (1) of the support legs (6) of the structure (5) formed by a profile (1.1) with a C-shaped section suitable for being adjusted on the exterior lateral contour of said support legs (6), with a height which covers the lower part of the legs and with a support base (1.2) to the ground.

In this first preferred embodiment of the invention, the structure (5) considered is a shelf of which the support legs (6) are going to be protected.

As is shown in FIGS. 1.1, 1.2 and 2, in this first preferred embodiment of the invention, the protection device also comprises two elements with a hollow truncated pyramid shape (2).

In the FIGS. 3.1 to 3.3, it is shown that said elements with a truncated pyramid shape (2) have three inclined sides (2.1) and an open side, an open lower base and an upper base, smaller than the lower base, which is open towards the open side, which has a horizontal flat surface (2.2) in the contour of the same corresponding to the three inclined sides (2.1) wherein the shape of the interior contour of this horizontal flat surface (2.2) is suitable for fitting the surface around the covering element (1) of the support leg (2).

In this first preferred embodiment of the invention, as can be observed in FIGS. 1.1, 1.2, and 2, the structure protector comprises a coupling element (3) fixed to the lower parts of the covering elements (1) which, as shown in FIGS. 4.1 to 4.3 has an exterior face (3.1) with the same inclination as the inclination of the two inclined sides (2.1) of the elements with a truncated pyramid shape (2) and a length equal to the distance between them.

Similarly, as is shown in FIGS. 1.1, 1.2 and 2, in this first preferred embodiment of the invention, the protector comprises two support crossbeams (4) as a joint between two covering elements (1) of the support legs (6) of the structure (5) which have, at each of their ends, means for fixing to the covering element (1) of one of said support legs (6) respectively.

In this first preferred embodiment of the invention, as is shown in FIGS. 1.1, 1.2 and 2, the support crossbeams (4) are arranged horizontally between the two covering elements (1) and only along one side of the same, but in other embodiments, the support crossbeams (4) could be arranged at both sides between the covering elements (1) and at one side be horizontal crossbeams (4) and at the other support crossbeams (4) arranged diagonally, either horizontal at both sides or diagonal at both sides.

These support crossbeams (4) can be observed in FIGS. 5.1 and 5.2.

In this first preferred embodiment of the invention, the means for fixing the support crossbeam (4) to the covering elements (1) where said covering elements (1) have a hole (7) in one of their laterals, are formed by a groove (8) arranged at each end of the support crossbeam (4) suitable for being situated to match a hole (7) respectively, and screwing means (9).

Moreover, for improved fixing, in this first preferred embodiment of the invention, the covering elements (1) comprise means for fixing to the ground, formed by holes in the support base (1.2) to the ground and screwing elements (10), as is shown in FIG. 2.

In this same FIG. 2, it can be observed that in this first preferred embodiment of the invention, these covering elements (1) also comprise reinforcement means formed by brackets (11) secured between the lower part of the profile (1.1) and the support base (1.2) to the ground.

In this first preferred embodiment of the invention, as is shown in FIG. 2.2, the coupling element (3) comprises reinforcement ribs (12) along the interior area of the exterior inclined face (3.1).

Figure 6:
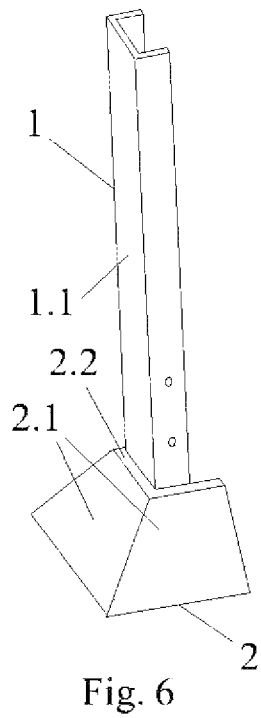
FIG. 6 shows a perspective view of a structure protection device for a second preferred embodiment of the invention.

A second preferred embodiment of the invention is presented in this specification in which the protection device is formed by a covering element (1) and a truncated pyramid element (2), as is shown in FIG. 6.

Figure 7:
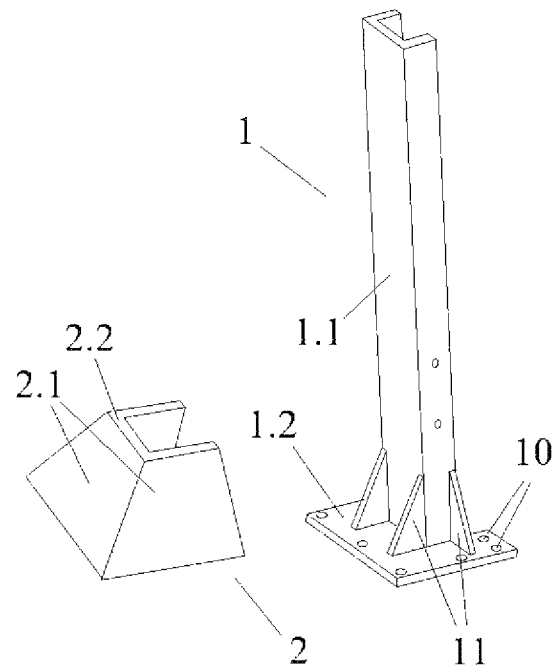
FIG. 7 shows an exploded view of the parts forming the structure protection device for a second preferred embodiment of the invention.

In this second preferred embodiment of the invention, as can be observed in FIG. 7, the covering element (1) comprises means for fixing to the ground, formed by holes in the support base (1.2) to the ground and screwing elements (10) as well as reinforcement means formed by brackets (11) secured between the lower part of the profile (1.1) and the support base (1.2) to the ground.

Figure 8:
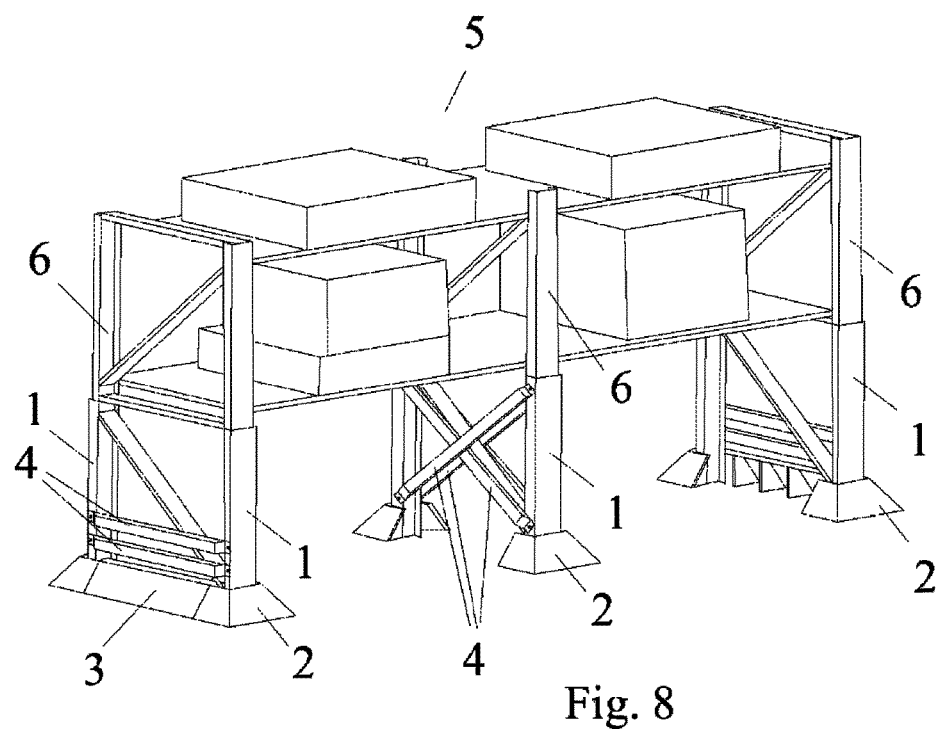
FIG. 8 shows a perspective view of a structure in which structure protection devices are used according to the first and second preferred embodiments of the invention.

In FIG. 8, a structure (5) can be observed formed by a shelf, in which the support legs (6) of the same are protected by means of various protection devices like those outlined both in the first and second embodiment, as the case may be.

In this Figure, it can be observed that in the case of the protection device of the second preferred embodiment of the invention, in which more than one support leg (6) is protected by means of a covering element (1) and an element with a truncated pyramid shape (2), but between them there is no coupling element (3) fixed to said covering elements (1), in this case, at least one support crossbeam (4) can be arranged between said covering elements (1) which can be horizontal, diagonal or along one side of the covering elements (1) horizontal and along the other side be arranged diagonally.

In this case, as is shown in FIG. 8, two support crossbeams (4) are arranged between said covering elements (1), diagonally, crossing each other.

The embodiments described only constitute examples of the present invention, therefore, the specific details, terms and phrases used in this specification should not be considered as limiting, but rather be understood merely as a base for the claims and as a representative base which provides a comprehensible description as well as sufficient information for the person skilled in the art to implement.

Using the structure protector presented here, significant improvements are achieved with respect to the prior art.

A structure protector can be integrated into the structure itself which is capable of protecting both the structure and its load.

Owing to the inclined faces of the protector, three sides of the legs of the structure exposed to the passage of the forklifts are protected.

When a forklift contacts the protector, it ascends along the inclined surface of the same and does not end up colliding with the structure owing to the horizontal flat surface present in the upper base of the element with a truncated pyramid shape, thereby preventing it impacting the structure.

A protection device is thus achieved which is easy and quick to install, and effectively prevents the collisions of forklifts with structures.

The invention claimed is:

1. Structure protector to prevent damage to support legs of warehouse shelf structure by forklift equipment, said structure protector comprising:
   a covering element (1) for a corresponding one of the support legs, said covering element (1) formed by a profile (1.1) with a C-shaped cross-section, said covering element suitable for being installed around an exterior lateral contour of the corresponding one of the support legs, said covering element (1) having a surface defined around said profile (1.1), said covering element having a height which covers a lower part of the corresponding one of the support legs, said covering element having a support base (1.2) fastened to the ground; and
   at least one of an element with a hollow truncated pyramid shape (2) having three inclined sides (2.1) and one open side, an open lower base and an upper base smaller than the lower base, said upper base open towards the open side, said upper base having a horizontal flat surface (2.2) in a contour corresponding to the same hollow truncated pyramid shape, said contour corresponding to the three inclined sides (2.1), said horizontal flat surface (2.2) having an interior contour shape suitable for fitting to said surface around said profile (1.1) of said covering element (1).

2. Structure protector (5) according to claim 1, comprising: at least two of said covering element (1), an equal number of said element with a hollow truncated pyramid shape (2), and a coupling element (3) fixed to lower parts of the at least two of said covering element (1), said coupling element (3) having an exterior inclined face (3.1) with inclination identical to the inclined sides (2.1) of said element with a hollow truncated pyramid shape (2), and said coupling element (3) having a length equal to distance between two of said elements with a hollow truncated pyramid shape.

3. Structure protector (5) according to claim 1, comprising: two of said covering elements and at least one support crossbeam (4) joined between said two covering elements.

4. Structure protector (5) according to claim 3, comprising: each of said covering element (1) comprising at least one hole (7) in at least one lateral portion of same; and elements for fixing each end of said at least one support crossbeam (4) to respective of said covering element (1).

5. Structure protector (5) according to claim 3, comprising: at least one of said at least one support crossbeam (4) arranged horizontally between said two of said covering element (1).

6. Structure protector (5) according to claim 3, comprising: at least one support crossbeam (4) arranged diagonally between said two of said covering element (1).

7. Structure protector (5) according to claim 1, comprising:
   said covering element (1) include holes in the support base (1.2); and
   screwing elements (10) received in said holes for fixation of the support base to the ground.

8. Structure protector (5) according to claim 1, comprising: said covering element (1) comprising reinforcement brackets (11) secured between a lower part of said profile (1.1) and said support base (1.2).

9. Structure protector (5) according to claim 2, comprising: said coupling element (3) comprising reinforcement ribs (12) along an interior area of said exterior inclined face (3.1).

* * * * *